(12) United States Patent
Lin et al.

(10) Patent No.: US 8,125,160 B2
(45) Date of Patent: *Feb. 28, 2012

(54) INTEGRATED CIRCUIT CAPABLE OF SYNCHRONIZATION SIGNAL DETECTION

(75) Inventors: Yung-Lin Lin, Palo Alto, CA (US); Yu-Cheng Chang, Cupertineo, CA (US)

(73) Assignee: O2Micro International Limited, Grand Cayman (KY)

( * ) Notice: Subject to any disclaimer, the term of this patent is extended or adjusted under 35 U.S.C. 154(b) by 27 days.

This patent is subject to a terminal disclaimer.

(21) Appl. No.: 12/574,244

(22) Filed: Oct. 6, 2009

(65) Prior Publication Data

US 2010/0026213 A1 Feb. 4, 2010

Related U.S. Application Data

(63) Continuation of application No. 11/050,528, filed on Feb. 3, 2005, now Pat. No. 7,598,679.

(51) Int. Cl.
*H05B 37/02* (2006.01)
(52) U.S. Cl. .......... 315/291; 315/307; 315/312
(58) Field of Classification Search .......... 315/209 R, 315/211, 225–226, 246, 291, 307, 312; 345/36, 345/38–39, 47, 82, 84, 87, 102
See application file for complete search history.

(56) References Cited

U.S. PATENT DOCUMENTS

| | | | |
|---|---|---|---|
| 5,408,265 A | 4/1995 | Sasaki | |
| 5,469,220 A * | 11/1995 | Kumada | 348/529 |
| 5,774,189 A * | 6/1998 | Ishii et al. | 348/563 |
| 5,844,540 A * | 12/1998 | Terasaki | 345/102 |
| 5,986,721 A * | 11/1999 | Jones et al. | 348/743 |
| 6,300,982 B1 | 10/2001 | Koh | |
| 6,603,516 B1 | 8/2003 | Fujiwara et al. | |
| 6,618,031 B1 | 9/2003 | Bohn et al. | |
| 6,680,588 B2 | 1/2004 | Park et al. | |
| 6,940,516 B1 * | 9/2005 | Dotson | 345/537 |
| 7,142,182 B2 | 11/2006 | Aoki et al. | |
| 7,391,172 B2 * | 6/2008 | Ferguson et al. | 315/308 |
| 7,417,616 B2 | 8/2008 | Min et al. | |
| 7,477,024 B2 * | 1/2009 | Lin et al. | 315/307 |
| 2002/0005830 A1 | 1/2002 | Watanabe | |
| 2002/0041335 A1 | 4/2002 | Taraci et al. | |
| 2002/0047632 A1 * | 4/2002 | Koyama | 315/291 |
| 2003/0016189 A1 * | 1/2003 | Abe et al. | 345/55 |
| 2003/0025462 A1 | 2/2003 | Weindorf | |
| 2003/0178951 A1 | 9/2003 | Park et al. | |
| 2004/0257329 A1 | 12/2004 | Park et al. | |
| 2005/0083294 A1 | 4/2005 | Kim et al. | |
| 2005/0122287 A1 | 6/2005 | Nishitani et al. | |
| 2005/0140640 A1 | 6/2005 | Oh et al. | |
| 2005/0269970 A1 | 12/2005 | Jang et al. | |

\* cited by examiner

*Primary Examiner* — Tung X Le
(74) *Attorney, Agent, or Firm* — Grossman, Tucker, Perreault & Pfleger, PLLC (57) ABSTRACT

A method according to one embodiment may include providing power to at least one light source. The method of this embodiment may also include detecting the frequency of at least one vertical synchronization signal, among a plurality of different synchronization signals, and controlling the power to at least one light source based on, at least in part, the detected frequency of at least one vertical synchronization signal. Of course, many alternatives, variations, and modifications are possible without departing from this embodiment.

20 Claims, 10 Drawing Sheets

INTEGRATED CIRCUIT CAPABLE OF SYNCHRONIZATION SIGNAL DETECTION

CROSS REFERENCE TO RELATED APPLICATIONS

This application is a continuation application of U.S. Non-provisional application Ser. No. 11/050,528 filed Feb. 3, 2005, now U.S. Pat. No. 7,598,679, the teachings of which are incorporated herein by reference.

FIELD

The present disclosure relates to an integrated circuit capable of synchronization signal detection.

BACKGROUND

A multi-system television complies with all major World broadcasting and video standards. Video standards include Phase Alternating Line (PAL), National Television System Committee (NTSC) and Sequential Color with Memory (SE-CAM). Most countries around the world utilize one of the three standards, but each standard is incompatible with each other.

The Vertical Frequency for PAL and SECAM is 50 Hz as specified in the standard (except PAL-M which is 60 Hz) while it is 60 Hz for NTSC standard. In a TV system, the Vertical Frequency is usually used for synchronizing other electronic circuit to avoid any interference to the display. This is often referred to as beating frequency effect. In addition, the Horizontal Frequency for PAL and SECAM is 15.625 KHz (except PAL-M which is 15.75 KHz) while it is 15.734 KHz for NTSC standard.

A lighting device for supplying power to a light source such as light emitting diodes or fluorescent lamps can be deriving from a DC/DC or DC/AC converters. These converters provide means of dimming control to adjust the amount of power delivered to the light source. One means of adjusting the power is to use pulse-width-modulation (PWM) technique (also called "burst mode dimming") where the power delivered to the light source is modulated through a PWM control signal. The PWM frequency is normally between few tens of Hz to several thousand Hz.

To reduce display noise, there is a need to synchronize the Vertical Frequency signal to the lighting device. The electronic circuit in the light device has to detect and identify the Vertical Frequency in the TV system so that the PWM signal for adjusting the power to the light source is automatically adjusted to any of the standard used in any TV system.

Normally the operating frequency of a DC/DC or DC/AC power converters is in the range of tens of KHz to hundreds of KHz. It is typically not difficult to synchronize the operating frequency to the Horizontal Frequency in an integrated circuit in the lighting device. However, because the vertical frequency is relatively low, it is challenging to synchronize the PWM dimming frequency to the Vertical Frequency in the TV system.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
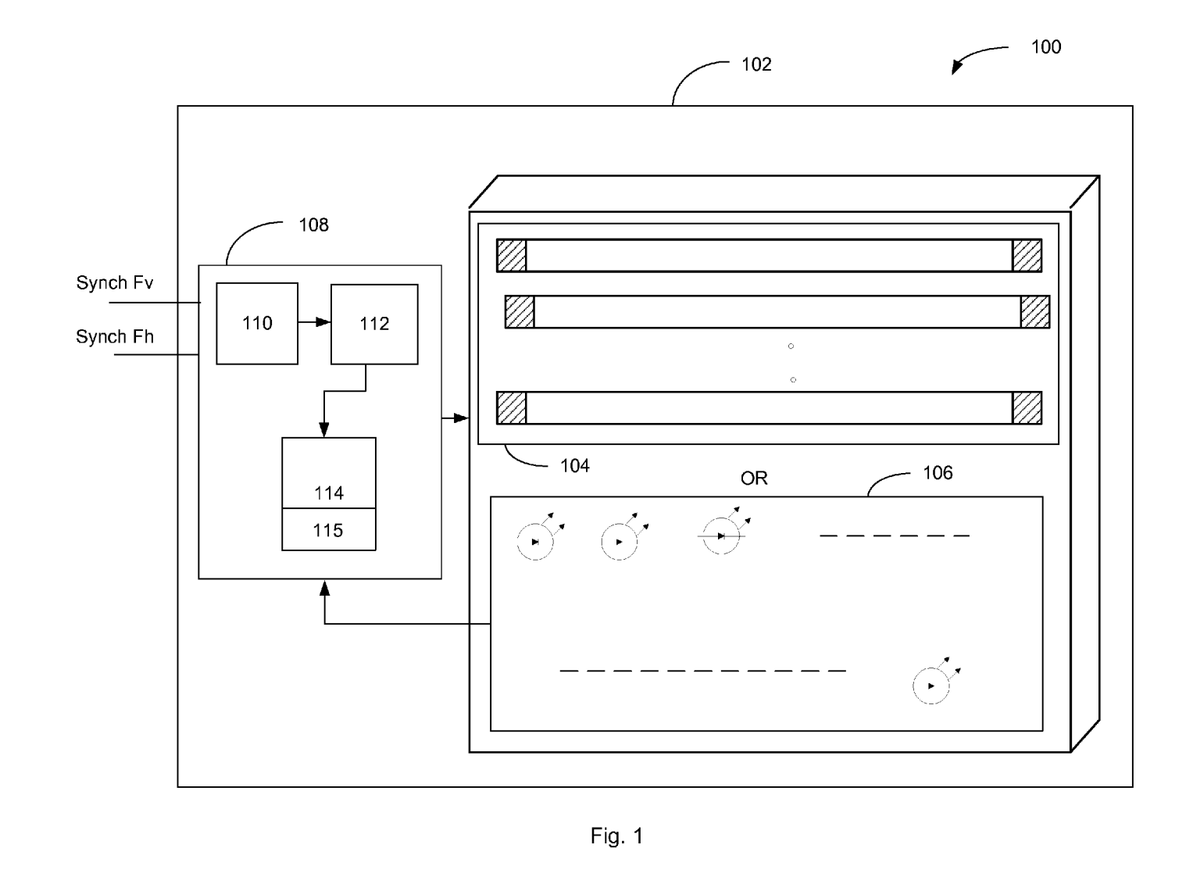
FIG. 1 is a diagram illustrating a system embodiment.

FIG. 1 illustrates a system embodiment 100 of the claimed subject matter. The system 100 may generally include a television display 102 comprising at least one fluorescent lamp 104 (which may comprise, for example, a cold cathode fluorescent lamp (CCFL)) or at least one light emitting diode (LED) 106. The system 100 may also comprise lighting circuitry 108 which may be capable of providing controllable power to at least one light source (e.g., at least one lamp 102 or at least one LED 106). In an embodiment where the light source is at least one LED 106, lighting circuitry 108 may comprise, for example, DC/DC converter circuitry 114 (which may include, for example, buck, boost, buck-boost, Cuk, SEPIC and/or zeta type converter circuitry) capable of supplying power to the light source. In an embodiment where the light source is at least one lamp 104, lighting circuitry 108 may comprises DC/AC inverter circuitry 115 (which may include, for example, full bridge, half bridge, push-pull and/or Class D type inverter circuitry). Circuitry 114 and/or 115 may include corresponding power train circuitry (not shown) and controller circuitry (also not shown) capable of controllably generating power. As used in any embodiment herein, "circuitry" may comprise, for example, singly or in any combination, hardwired circuitry, programmable circuitry, state machine circuitry, and/or firmware that stores instructions executed by programmable circuitry. Lighting circuitry 108 and/or other circuitry comprised in panel 102 may individually or collectively comprise one or more integrated circuits. As used in any embodiment herein, an "integrated circuit" means a semiconductor device and/or microelectronic device, such as, for example, a semiconductor integrated circuit chip.

Panel 102 may also comprise memory (not shown) which may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively, memory may comprise other and/or later-developed types of computer-readable memory. Machine-readable firmware program instructions may be stored in memory. As described below, these instructions may be accessed and executed by lighting circuitry 108, and these instructions may result in lighting circuitry 108 performing the operations described herein as being performed by lighting circuitry 108 and/or other circuitry comprised in panel 102.

In this embodiment, lighting circuitry 108 may comprise synchronization signal detection circuitry 110 and PWM dimming circuitry 112. Synchronization detection circuitry 110 may be capable of receiving a vertical synchronization signal (Synch Fv) and determining if the Synch Fv signal has a frequency that complies with a PAL, NTSC and/or SECAM vertical synchronization signal. Synchronization detection circuitry 110 may be capable of receiving a horizontal synchronization signal (Synch Fh) and determining if the Synch Fh signal has a frequency that complies with a PAL, NTSC and/or SECAM horizontal synchronization signal. Circuitry 110 may generate a signal 312 indicating weather the Synch Fv signal is a PAL, NTSC and/or SECAM vertical synchronization signal.

As is well understood in the art, PWM circuitry 112 may be capable of generating a pulse width modulated (PWM) signal to controllably reduce or increase the output power of lighting circuitry 108 (and thus controllably reducing or increasing the amount of light produced by the lamp 104 or the LED 106) based on, at least in part, the duty cycle of the PWM signal. In this embodiment, the frequency of the PWM signal generated by PWM circuitry 112 may be based on the frequency of the vertical synchronization signal (Synch Fv) determined by synchronization detection circuitry 110. "Based on" may mean that the PWM signal may be synchronized or related to the vertical synchronization signal. "Synchronized" may mean, for example, that the PWM signal is a whole number multiple of the vertical synchronization signal synchronization signal, however, "synchronized" is not limited in this respect and may alternatively mean that the PWM signal is any multiple of the vertical synchronization signal.

Figure 2:
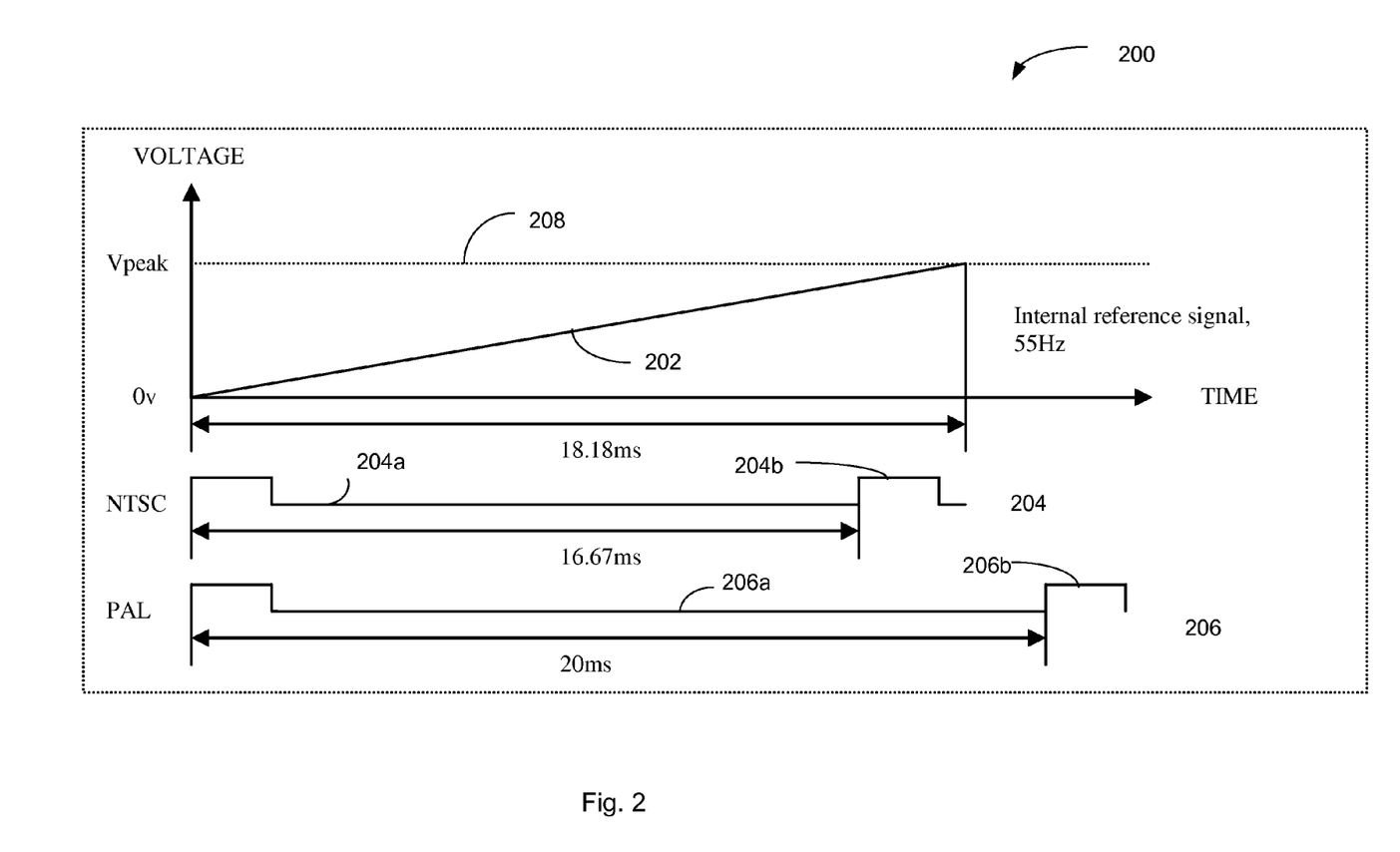
FIG. 2 is a graph of exemplary signals according to an embodiment.

FIG. 2 depicts a graph 200 of exemplary signals according to an embodiment. Lighting circuitry 108 may be capable of receiving an NTSC vertical synchronization signal 204 having a period of 16.67 ms. (corresponding to a Synch Fv of 60 Hz) and a PAL vertical synchronization signal 206 having a period of 20 ms., corresponding to a Synch Fv of 50 Hz. NTSC vertical synchronization signal 204 may comprise a logic HIGH portion 204b and a logic LOW portion 204a, and similarly, PAL vertical synchronization signal 206 may comprise a logic HIGH portion 206b and a logic LOW portion 206a. Lighting circuitry 108 may be capable of generating an internal reference signal 202 having a period that is between the period of the NTSC vertical synchronization signal 204 and the PAL vertical synchronization signal 206. In this exemplary embodiment, internal reference signal 202 may comprise a ramp signal having a period that is halfway between the NTSC and PAL synchronization signals (204 and 206), i.e., 18.18 ms Corresponding to a frequency of 55 Hz. Of course, this is only an example and the present invention is not limited to this particular frequency for the internal reference signal 202.

The slope of the internal reference signal 202 may be fixed so that it intersects a DC reference signal, Vpeak 208, at a point that is between the period of the NTSC vertical synchronization signal 204 and the PAL vertical synchronization signal 206. Accordingly, Vpeak 208 may be selected based on a desired frequency of the internal reference signal 202.

Figure 3:
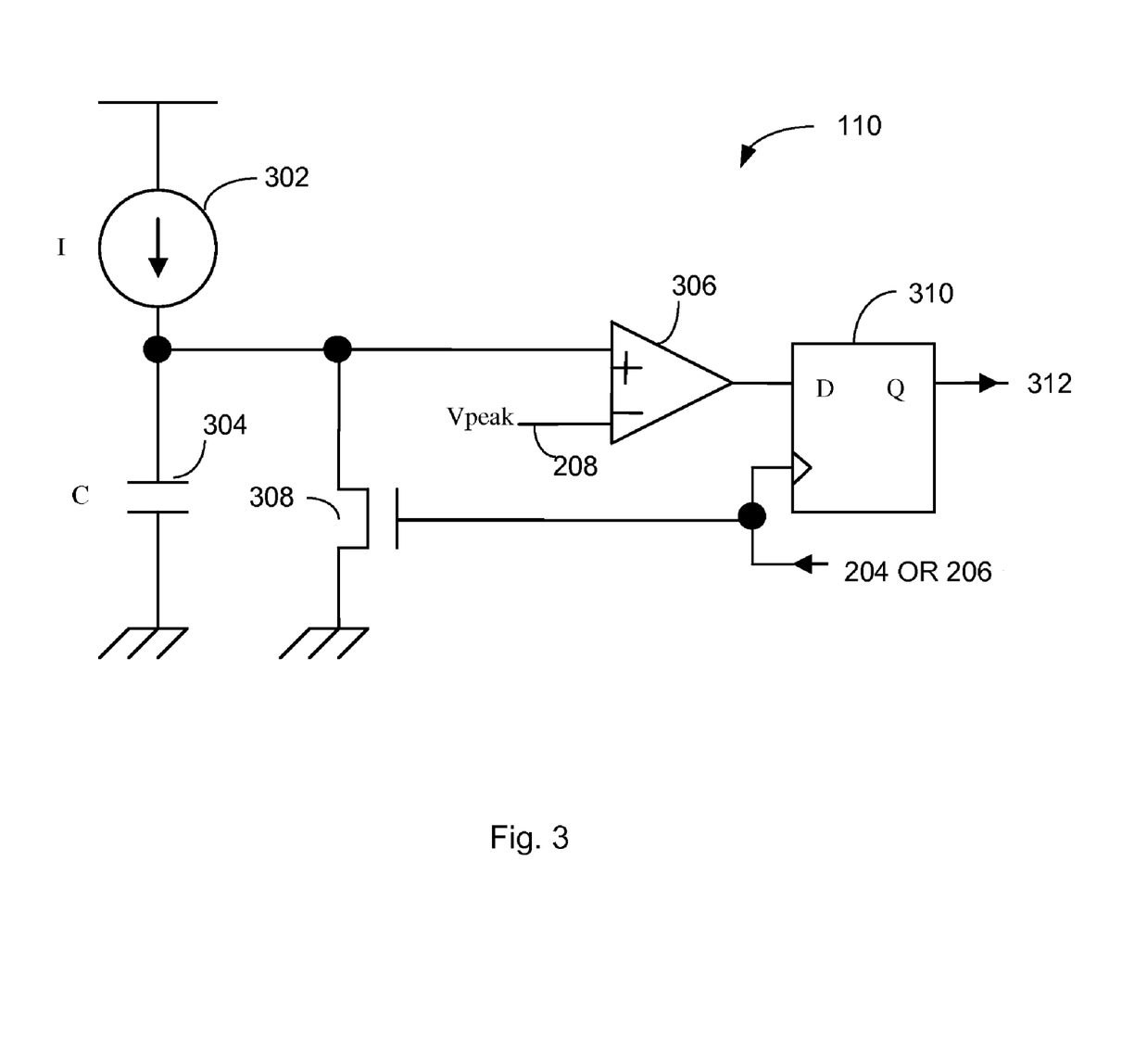
FIG. 3 is a diagram illustrating vertical synchronization detection circuitry according to an embodiment.

FIG. 3 illustrates exemplary synchronization signal detection circuitry 110 according to one embodiment. In this embodiment, the synchronization signal detection circuitry 110 may include a current source I (302) charging a capacitor C (304). Circuitry 110 may also include a comparator 306 that compares the voltage across capacitor 304 (which may correspond to the internal reference signal 202) to the DC reference signal Vpeak 208. A flip flop circuit 310 may be included that receives the output of comparator 306 and the vertical synchronization signal 204 or 206, as depicted. A switch 308 may be coupled between the internal reference signal (Vc) 202 and ground, and the conduction state of switch 308 may be controlled by vertical synchronization signal 204 or 206. Operation of the exemplary synchronization signal detection circuitry 110 according to this embodiment is described in greater detail below.

Current source 302 may charge capacitor 304 to generate internal reference signal 202. In this case, internal reference signal 202 may comprise a ramp signal as depicted in FIG. 2. Internal reference signal 202 may be compared, via comparator 306, to the DC reference signal Vpeak 208. The output of comparator may remain unchanged until the internal reference signal 202 is equal to or greater than Vpeak 208. Switch 308 may be coupled across capacitor 304, i.e., between internal reference signal 202 and ground. When switch 308 is ON (conducting), switch 308 may operate to discharge the charge on capacitor 304.

In operation, if the synchronization signal 204 or 206 is an NTSC synchronization signal 204, then when signal 204 changes state from LOW to HIGH, switch 308 may conduct and capacitor 304 may be discharged through switch 308. In this case, internal reference signal 202 may not reach Vpeak 208 and the output 312 of flip-flop 310 may remain at one output level (for example, either HIGH or LOW). If the synchronization signal 204 or 206 is a PAL synchronization signal 206, then internal reference signal 202 may reach Vpeak 208 (before signal 206 causes switch 308 to conduct) and the output 312 of flip-flop 310 may change states (for example LOW to HIGH). Thus, in this embodiment, if the output 312 of flip-flop 310 remains at one level, then synchronization signal 204 or 206 is an NTSC signal and if the output 312 of flip-flop 310 changes state, then synchronization signal 204 or 206 is a PAL signal.

As stated, lighting circuitry 108 including synchronization signal detection circuitry 110 may be embodied as an integrated circuit. In such an embodiment, the size of capacitor 304 may be limited due to, for example, the size and/or temperature effects associated with silicon implementations of capacitance. Typically, if capacitor 304 is built in silicon, the capacitance value may be on the order of a few tens of picoFarads (pF). Current source 302 may be in the microamp range ($10^{-6}$). Current sources and capacitance in this range may cause Vpeak to be thousands of volts. In order to match the current source 302 with the capacitor 304, the current source may be scaled down to a current in the nanoamp range ($10^{-9}$).

Figure 4:
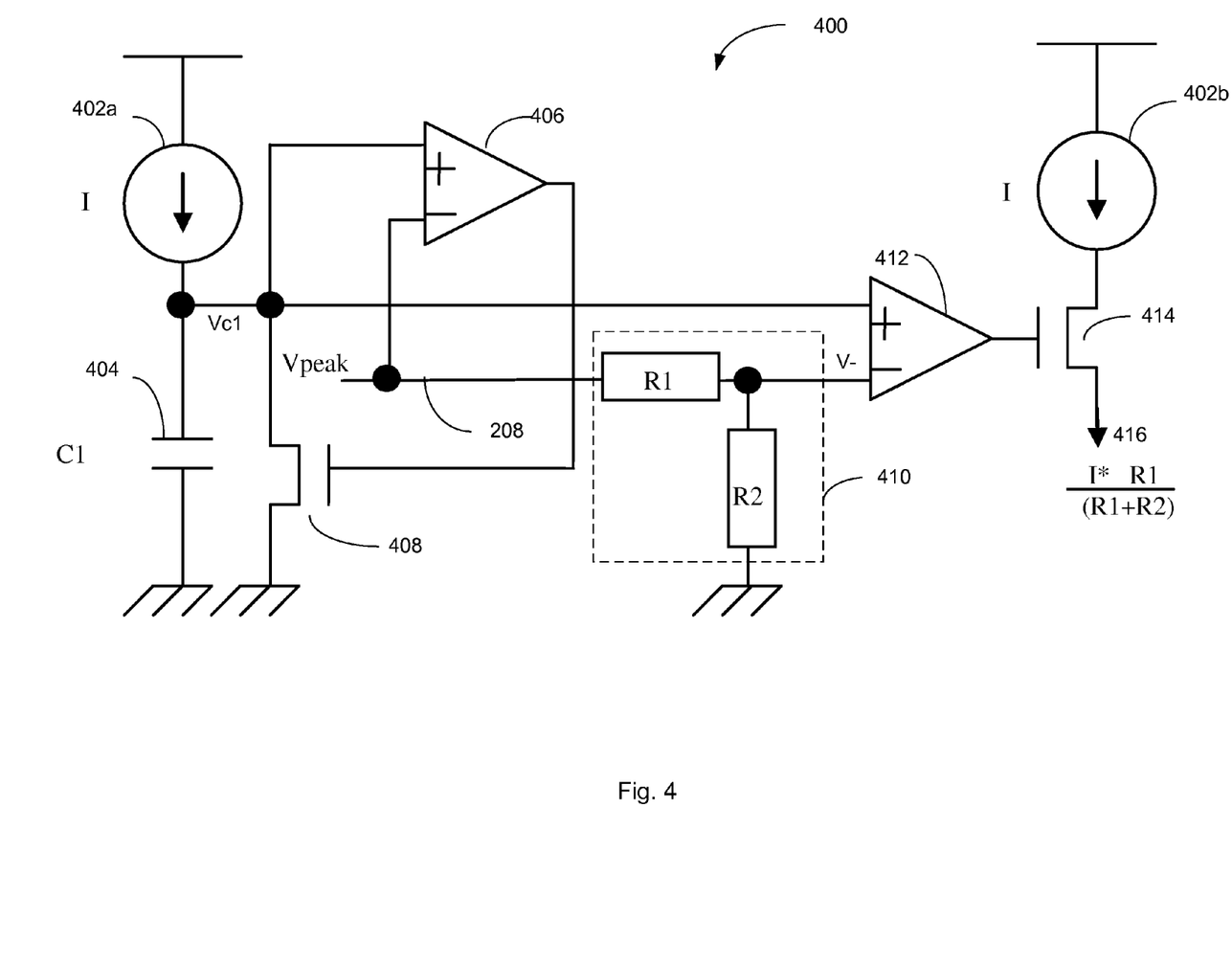
FIG. 4 is a diagram illustrating current scale circuitry according to an embodiment.

Accordingly, FIG. 4 depicts exemplary current scale circuitry 400 according to one embodiment. Scale circuitry 400 may include a first current source 402a capable of charging a capacitor (C1) 404. In this embodiment, current source 402a may produce current in the micro amp range and capacitor 404 may be in the picoFarad range (e.g. 10 pF). Circuitry 400 may also include a first comparator 406 that compares the voltage across capacitor 404 (Vc1) to the DC reference signal Vpeak 208. This embodiment may also include a first switch 408 coupled between the voltage across capacitor 404 (Vc1) and ground. The output of comparator 406 may be capable of controlling the conduction state of switch 408 which may operate to controllably discharge capacitor 404 in manner described in greater detail below.

This embodiment may also include voltage divider circuitry 410 (which may include, for example, resistors R1 and R2 as depicted) coupled to the DC reference signal Vpeak 208 and producing a voltage V−. In this embodiment, Vpeak is reduced to V− by the factor of the voltage divider circuitry 410. The value of V− may be given by:

$$V-=V\text{peak}(R2/(R1+R2)) \qquad \text{eq. 1}$$

Circuitry 400 may also include a second comparator 412 that compares the voltage across capacitor 404 (Vc1) to the output, V−, of voltage divider circuitry 410. Circuitry 400 may also include a second switch 414 capable of controlling the total output of current source 402b (current source 402b, similar to current source 402a, may produce current in the micro amp range). The output of comparator 412 may be capable of controlling the conduction state of switch 414 to generate a scaled down current source 416 from current source 402b in a manner described in greater detail below.

Figure 4A:
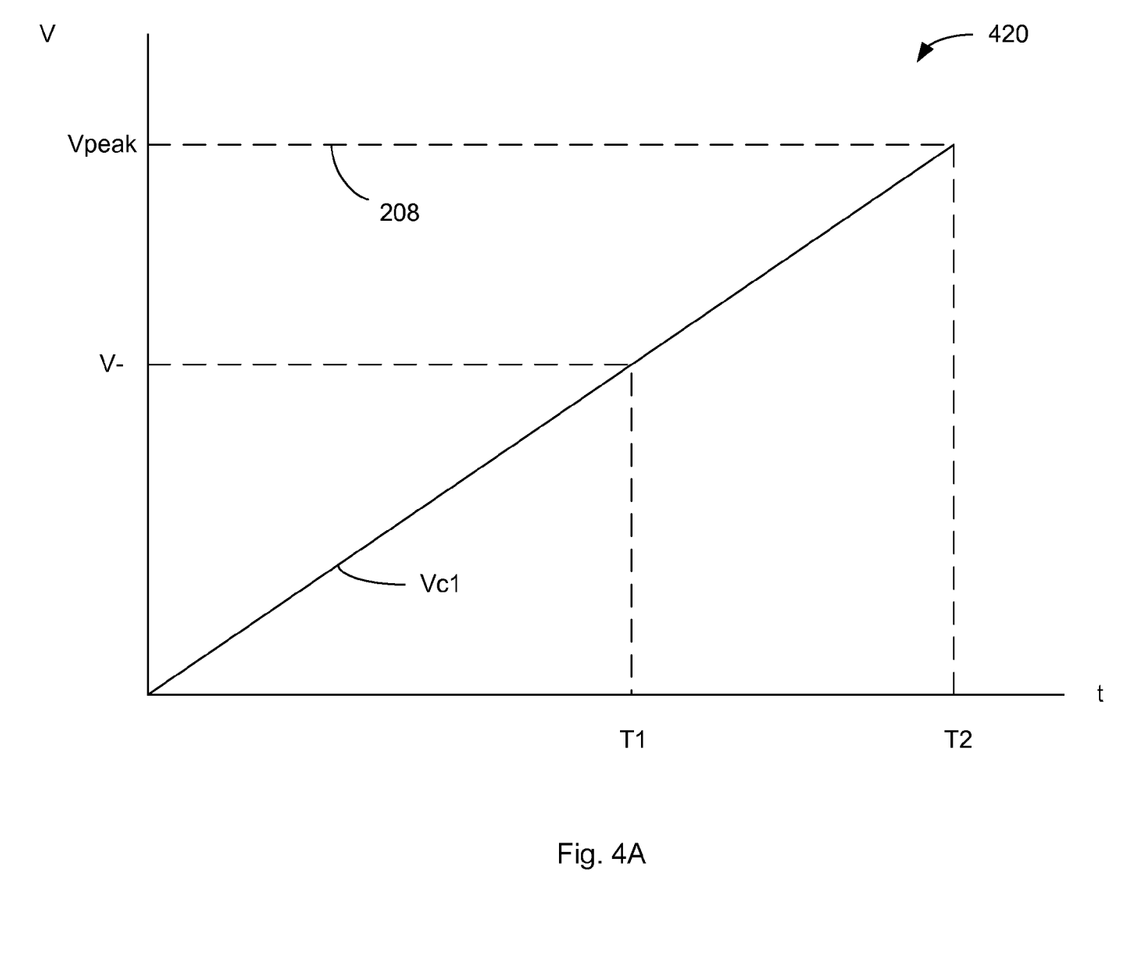
FIG. 4A is a graph depicting exemplary operations of the circuitry of FIG. 4.

FIG. 4A is a graph 420 depicting exemplary operations of the circuitry of FIG. 4. In operation, and referring to FIG. 4A with continued reference to FIG. 4, the time it takes for current source (I) 402a (charging capacitor 404) to reach V− may be given by:

$$T1=C1(V-)/I=(C1(V\text{peak})/1)*(R2/(R1+R2)) \qquad \text{eq. 2}$$

Once the voltage across capacitor 404 (Vc1) is equal to (or greater than) V−, the output of comparator 412 may change state which, in turn, may cause switch 414 to turn ON (conducting). While the voltage across capacitor 404 V− is less V−, the output of comparator 412 may remain unchanged, and accordingly, during this time period (i.e., between 0 and T1 in FIG. 4A) switch 414 may remain OFF (nonconducting).

The time it takes for current source (I) 402a (charging capacitor 404) to reach Vpeak may be given by:

$$T2=C1(V\text{peak})/I \qquad \text{eq. 3}$$

Once the voltage across capacitor 404 (Vc1) is equal to (or greater than) Vpeak (208), the output of comparator 406 may change state (to HIGH, for example) which, in turn, may cause switch 408 to turn ON (conducting) which may discharge capacitor 404 and reduce Vc1 to zero. Thus, switch 414 may be conducting between T1 and T2, and off between 0 and T1.

Figure 4B:
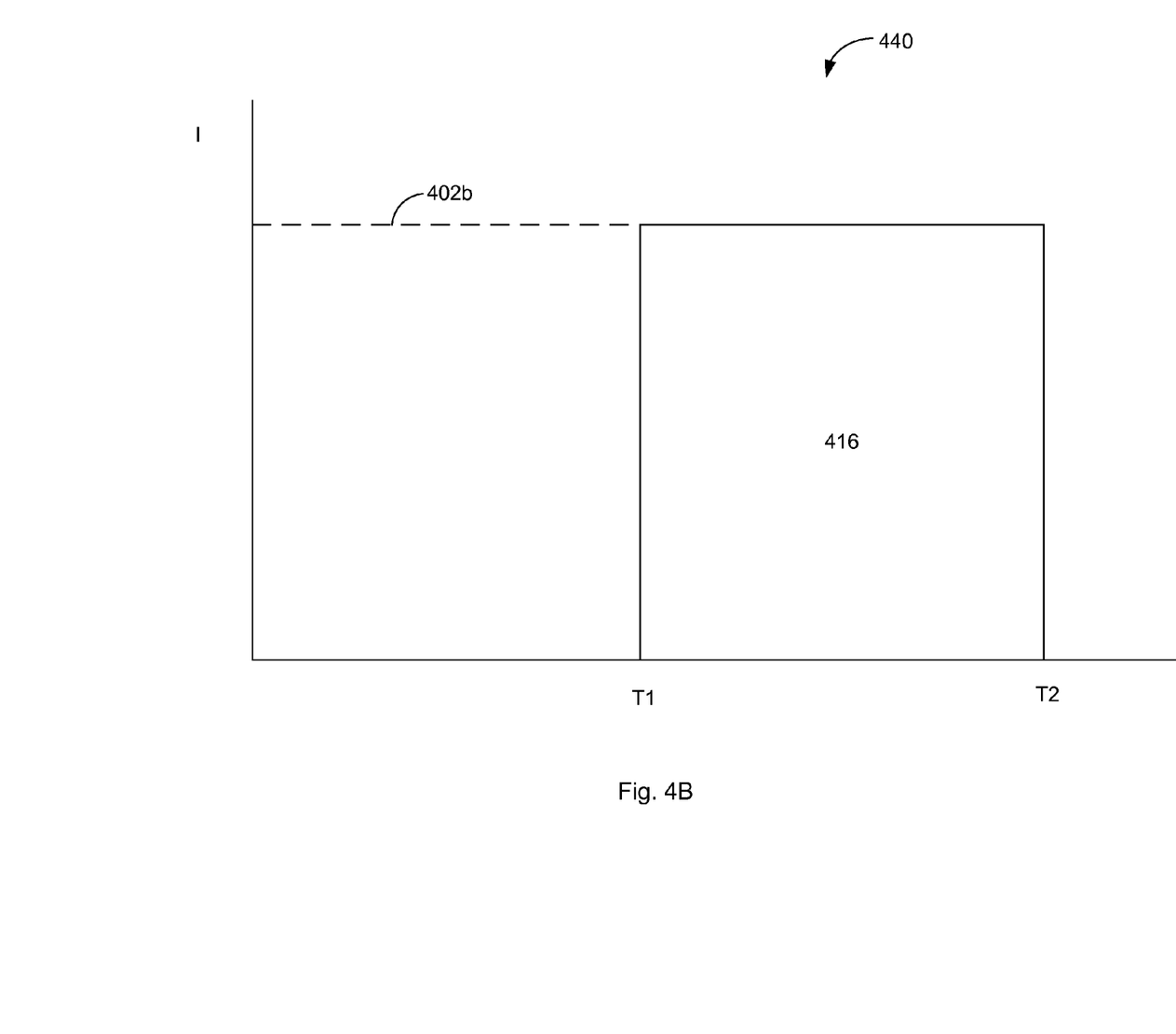
FIG. 4B is a graph depicting exemplary operations of the circuitry of FIG. 4.

In this manner, current source 402b may be modulated through switch 414, which may generate a scaled current 416 with a cycle period of T2 and a duty cycle of (T2−T1)/T2, as depicted in FIG. 4B. FIG. 4B is a graph 440 depicting further exemplary operations of the circuitry of FIG. 4. The average (modulated) current 416 may be given by:

$$I*(T2-T1)/T2=I*(1-(T1/T2));$$

substituting from equations 2 and 3 (given above):

$$I*[1-(C1*V\text{peak}*R2/I(R1+R2))*(1/((C1*V\text{peak})/I))];$$

which reduces to:

$$I(R1/(R1+R2)).$$

Thus, the output current 416 may be reduced by a factor of R1/(R1+R2). In this embodiment, R1 and/or R2 may be selected so that output current 416 is in the appropriate range to operate with capacitor 304 as described above with reference to FIG. 3.

Figure 5:
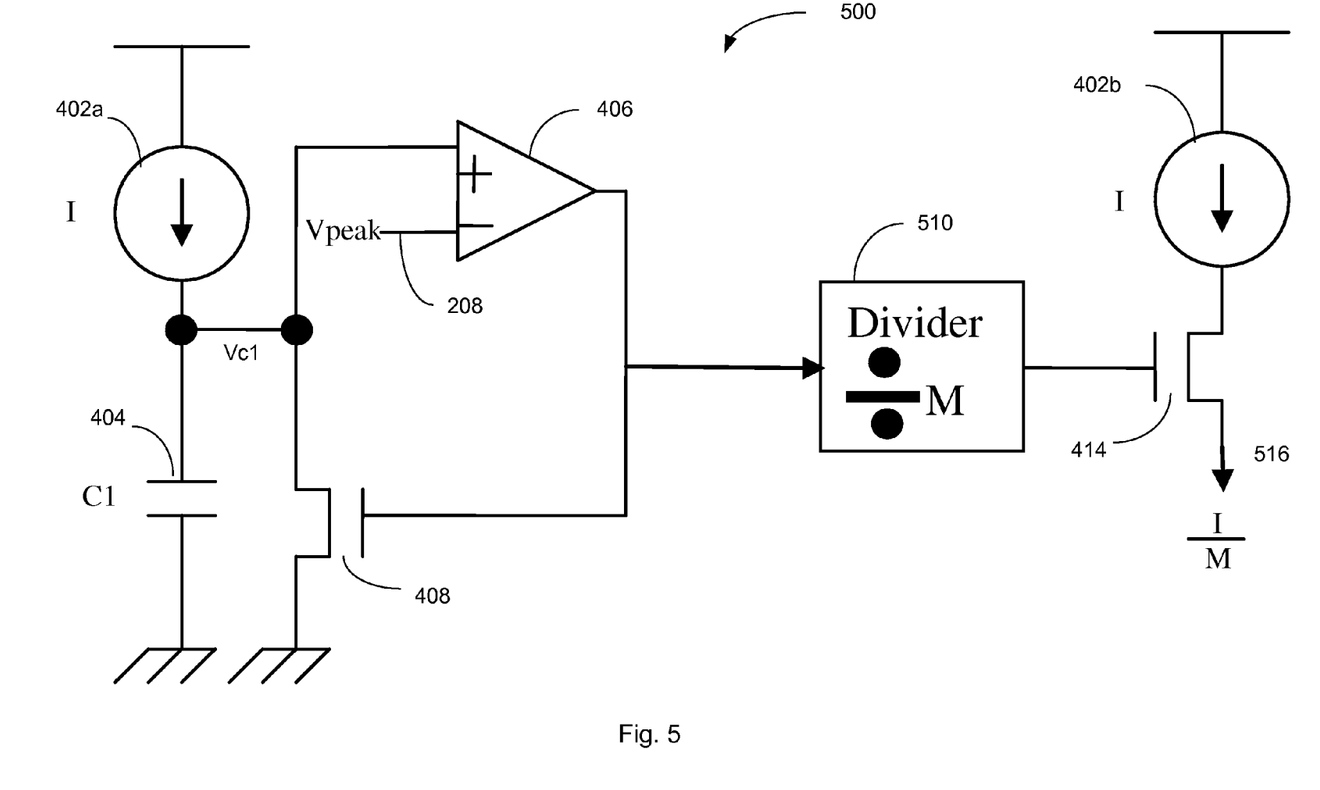
FIG. 5 is a diagram illustrating current scale circuitry according to another embodiment.

FIG. 5 depicts exemplary current scale circuitry 500 according to another embodiment. This embodiment operates in a similar as described above with reference to FIGS. 4, 4A and 4B, except this embodiment may include divider circuitry 510 which may comprise, for example, flip-flop circuitry. Divider circuitry 510 may be capable of controlling the conduction state of switch 414 by changing states with a period of M. Thus, output current 516 may be given by I/M. In this embodiment, M may be selected so that output current 516 is in the appropriate range to operate with capacitor 304 as described above with reference to FIG. 3.

Figure 6:
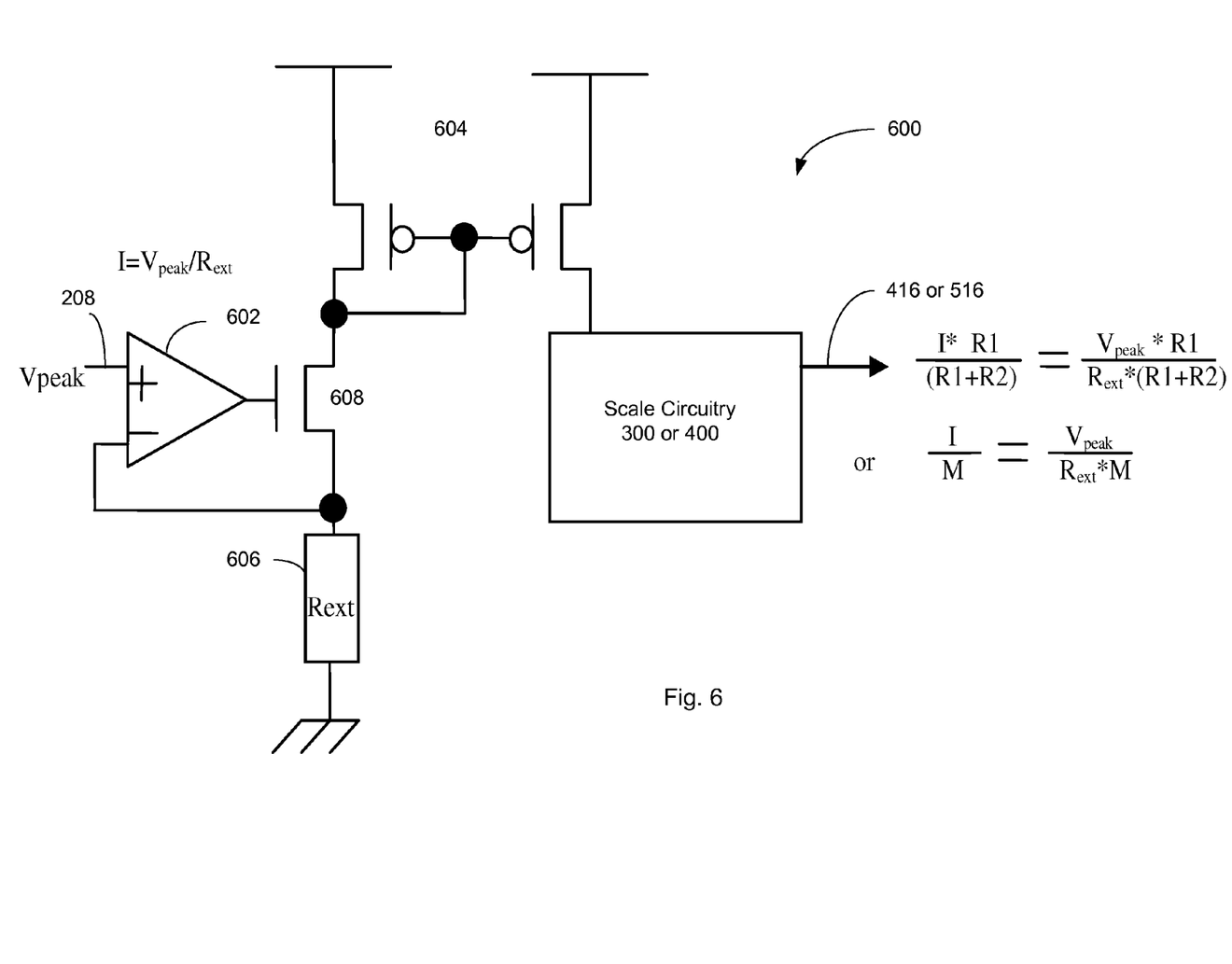
FIG. 6 is a diagram illustrating current source circuitry according to an embodiment.

FIG. 6 depicts one exemplary embodiment of current source circuitry 600. Circuitry 600 may include current mirror circuitry 604 capable of generating approximately the same current I through the left half and right half. Circuitry 600 may also include a comparator 602 capable of controlling the conduction state of switch 608. Switch 608 may be coupled to a resistor (Rext) 606, and current flowing through the resistor, I, may be controlled by comparator 602. Comparator 602 may compare Vpeak 208 with the voltage across resistor 606, which may operate to limit the current I to I=Vpeak/Rext; where I may be in the microamp range. The current I generated in the left leg of current mirror 604 may be translated to the right leg of current mirror 604. Scale circuitry, for example scale circuitry 400 (FIG. 4) or 500 (FIG. 5) may be coupled to the right leg of current mirror 604 to generate a scaled current output, for example 416 (FIG. 4) or 516 (FIG. 5).

Figure 7:
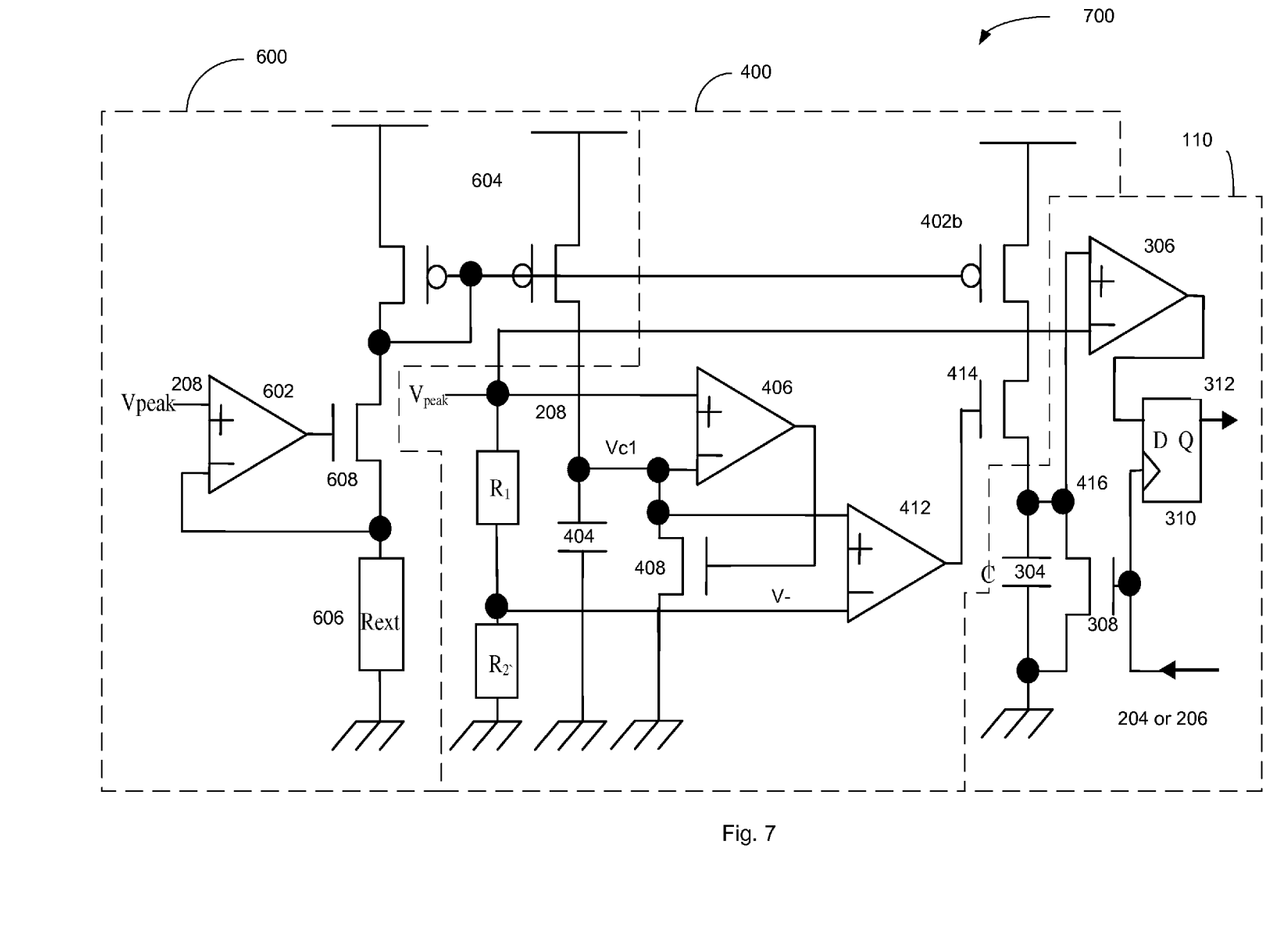
FIG. 7 illustrates exemplary synchronization signal detection circuitry according to another embodiment.

FIG. 7 illustrates exemplary circuit implementation 700 according to another embodiment. This embodiment essentially combines current source circuitry 600 depicted in FIG. 6 and current scale circuitry 400 depicted in FIG. 4 which may thus form current source 302 of FIG. 3. Synchronization signal detection circuitry 110 (depicted in FIG. 3) in this embodiment is shown except current source 302, and current source 402b may be formed by current mirror-mirror circuitry in which current generated by current mirror 604 is mirrored to current scale circuitry 400, as depicted. The operation of the circuitry of FIGS. 3, 4 and 6 is described herein with reference to these figures.

Figure 8:
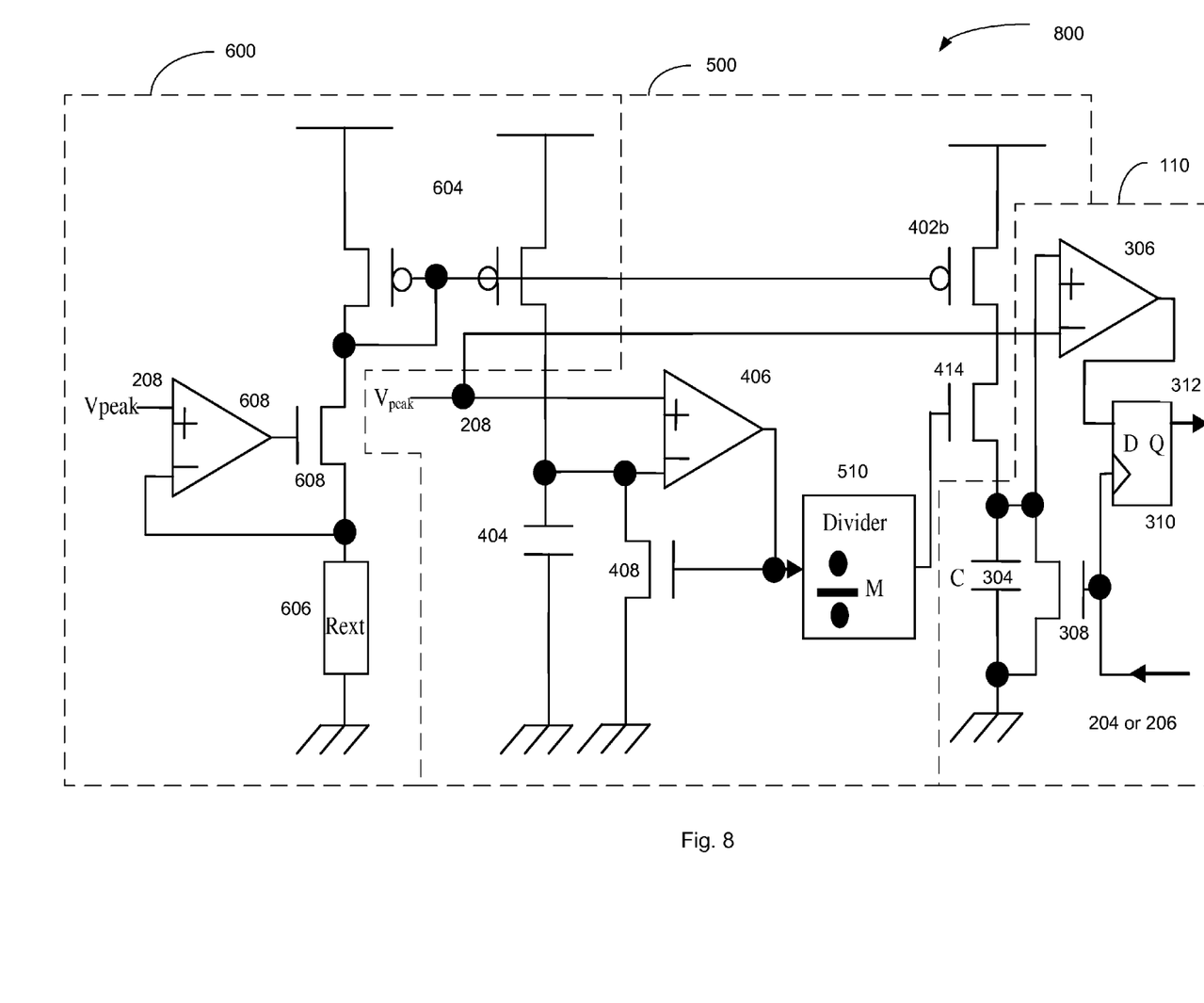
FIG. 8 illustrates exemplary synchronization signal detection circuitry according to yet another embodiment.

FIG. 8 illustrates exemplary synchronization signal detection circuitry 800 according to yet another embodiment. This embodiment essentially combines current source circuitry 600 depicted in FIG. 6 and current scale circuitry 500 depicted in FIG. 5 which may thus form current source 302 of FIG. 3. Synchronization signal detection circuitry 110 (depicted in FIG. 3) in this embodiment is shown except current source 302, and current source 402b may be formed by current mirror-mirror circuitry in which current generated by current mirror 604 is mirrored to current scale circuitry 400, as depicted. The operation of the circuitry of FIGS. 3, 5 and 6 is described herein with reference to these figures.

Thus, in summary, one apparatus embodiment may provide an integrated circuit capable of providing power to at least one light source. The integrated circuit of this embodiment may also be capable of detecting the frequency of at least one vertical synchronization signal, among a plurality of different synchronization signals. The integrated circuit of this embodiment may also be capable of controlling the power to said at least one light source based on, at least in part, the detected frequency of said at least one vertical synchronization signal.

Advantageously, the integrated circuit of this embodiment may be capable of automatically adapting to any broadcasting and video standard. Hence, the integrated circuit of this embodiment may provide an effective and low-cost means to power a light source.

Further advantageously, the integrated circuit of this embodiment may be capable of synchronizing the dimming control PWM signal in the lighting device to the frequency of the vertical synchronization signal. The integrated circuit of this embodiment may be manufactured monolithically thereby increasing component control and reducing cost.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

The invention claimed is:

1. A circuit for providing power to a light source, comprising:
   synchronization circuitry configured to receive a synchronization signal and determining whether said synchronization signal complies with at least one of a Phase Alternating Line (PAL) standard or a National Television System Committee (NTSC) standard, wherein said synchronization circuitry comprises flip-flop circuitry configured to receive said synchronization signal and a comparison result between a plurality of reference signals which include a predetermined DC reference signal and to generate a detection signal indicating whether said synchronization signal complies with said at least one of said PAL standard or said NTSC standard; and
   pulse width modulation circuitry configured to generate a pulse width modulation signal based on a frequency of said synchronization signal to adjust power of said light source.

2. The circuit of claim 1, wherein said synchronization circuitry further comprises:
   a current source configured to generate an internal reference signal; and
   a comparator coupled to said current source and configured to compare said internal reference signal with said predetermined DC reference signal and to generate said comparison result.

3. The circuit of claim 2, wherein said synchronization circuitry further comprises a switch coupled to said current source and said comparator, wherein a conductance state of said switch is controlled by said synchronization signal.

4. The circuit of claim 2, wherein said internal reference signal intersects with said predetermined DC reference signal at a point that is between a period of said synchronization signal complying with said PAL standard and a period of said synchronization signal complying with said NTSC standard.

5. The circuit of claim 2, wherein said comparison result has a first state if said synchronization signal changes state before said internal reference signals reaches said predetermined DC reference signal, and wherein said comparison result has a second state if said synchronization signal changes state after said internal reference signal reaches said predetermined DC reference signal.

6. The circuit of claim 1, wherein said synchronization circuitry is further configured to determine if said synchronization signal complies with a Sequential Color with Memory (SECAM) standard.

7. The circuit of claim 1, wherein said light source comprises a cold cathode fluorescent lamp.

8. The circuit of claim 1, wherein said light source comprises a light emitting diode.

9. A display system comprising:
   a display panel comprising a light source; and
   lighting circuitry for illuminating said light source, said lighting circuitry comprising:
   synchronization circuitry configured to receive a synchronization signal and determining whether said synchronization signal complies with at least one of a Phase Alternating Line (PLA) standard or a National Television System Committee (NTSC) standard, wherein said synchronization circuitry comprises flip-flop circuitry configured to receive said synchronization signal and a comparison result between a plurality of reference signals which include a predetermined DC reference signal and to generate a detection signal indicating whether said synchronization signal indicating whether said synchronization signal complies with said at least one of said PAL standard or said NTSC standard; and
   pulse width modulation circuitry configured to generate a pulse width modulation signal based on a frequency of said synchronization signal to adjust power of said light source.

10. The display system of claim 9, wherein said synchronization circuitry further comprises:
    a current source configured to generate an internal reference signal; and
    a comparator coupled to said current source and configured to compare said internal reference signal with a said predetermined DC reference signal and to generate said comparison result.

11. The display system of claim 10, wherein said synchronization circuitry further comprises a switch coupled to said current source and said comparator, wherein a conductance state of said switch is controlled by said synchronization signal.

12. The display system of claim 10, wherein said internal reference signal intersects with said predetermined DC reference signal at a point that is between a period of said synchronization signal complying with said PAL standard and a period of said synchronization signal complying with said NTSC standard.

13. The display system of claim 10, wherein said comparison result has a first state if said synchronization signal changes state before said internal reference signal reaches said predetermined DC reference signal, and wherein said comparison result has a second state if said synchronization signal changes state after said internal reference signal reaches said predetermined DC reference signal.

14. The display system of claim 9, wherein said synchronization circuitry is further configured to determine if said synchronization signal complies with a Sequential Color with Memory (SECAM) standard.

15. The display system of claim 9, wherein said light source comprises a cold cathode fluorescent lamp.

16. The display system of claim 9, wherein said light source comprises a light emitting diode.

17. A method for providing power to a light source, said method comprising:
    receiving a synchronization signal;
    adjusting an internal reference signal based on said synchronization signal;
    comparing said internal reference signal with a predetermined DC reference signal;
    generating a detection signal indicating whether said synchronization signal complies with at least one of a Phase Alternating Line (PAL) standard or a National Television System Committee (NTSC) standard;
    generating a pulse width modulation signal based on a frequency of said synchronization signal; and
    adjusting power to said light source.

18. The method of claim 17, further comprising:
    determining if said synchronization signal complies with a Sequential Color with Memory (SECAM) standard.

19. The method of claim 17, wherein said light source comprises a cold cathode fluorescent lamp.

20. The method of claim 17, wherein said light source comprises a light emitting diode.

* * * * *